US010873289B1

(12) United States Patent
Tevendale

(10) Patent No.: US 10,873,289 B1
(45) Date of Patent: Dec. 22, 2020

(54) ADJUSTABLE BRACKET FOR A SOLAR PANEL

(71) Applicant: Peter Tevendale, Dunmore, PA (US)

(72) Inventor: Peter Tevendale, Dunmore, PA (US)

( * ) Notice: Subject to any disclaimer, the term of this patent is extended or adjusted under 35 U.S.C. 154(b) by 462 days.

(21) Appl. No.: 15/823,716

(22) Filed: Nov. 28, 2017

(51) Int. Cl.
| *B25B 1/20* | (2006.01) |
| *H02S 20/23* | (2014.01) |
| *E04F 21/18* | (2006.01) |
| *F16M 13/02* | (2006.01) |
| *B23Q 3/18* | (2006.01) |
| *F24S 25/10* | (2018.01) |
| *F24S 50/20* | (2018.01) |
| *F24S 25/60* | (2018.01) |
| *F24S 25/00* | (2018.01) |

(52) U.S. Cl.
CPC .............. *H02S 20/23* (2014.12); *B23Q 3/186* (2013.01); *E04F 21/1855* (2013.01); *F16M 13/02* (2013.01); *F24S 25/10* (2018.05); *F24S 25/60* (2018.05); *F24S 2025/014* (2018.05); *F24S 2025/018* (2018.05); *F24S 2025/6006* (2018.05); *F24S 2050/25* (2018.05)

(58) Field of Classification Search
CPC ... B23Q 3/00; B23Q 3/06; B23Q 3/04; B23Q 3/186; H02S 20/20; H02S 20/22; H02S 20/2023
See application file for complete search history.

(56) References Cited

U.S. PATENT DOCUMENTS

| 4,002,328 | A | * | 1/1977 | Wolff | ...................... B25B 1/103 269/97 |
| 4,836,517 | A | * | 6/1989 | Vossler | ................... B25B 5/003 269/41 |
| 5,192,060 | A | * | 3/1993 | Novak | ..................... B25B 5/003 269/147 |
| 5,494,553 | A | * | 2/1996 | Colucci | ................... B25B 5/003 156/580 |
| 5,785,305 | A | * | 7/1998 | Stalker | ..................... B25B 5/142 269/228 |
| 6,155,547 | A | * | 12/2000 | Gatanas | ..................... B25B 5/12 269/41 |
| 7,765,664 | B2 | * | 8/2010 | Duarte | .................... B25B 27/24 29/215 |
| 8,079,566 | B1 | * | 12/2011 | Hurst | ...................... E04G 17/12 249/2 |
| D670,160 | S | | 11/2012 | Bitarchas | |
| 2008/0244881 | A1 | | 10/2008 | Zante | |
| 2010/0269447 | A1 | * | 10/2010 | Schuit | ................... F24S 25/634 52/698 |

(Continued)

FOREIGN PATENT DOCUMENTS

FR          2944817 A1    8/2011

*Primary Examiner* — Lee D Wilson

(57) ABSTRACT

The adjustable bracket for a solar panel is configured for use with a solar panel array and the associated panel rack. The adjustable bracket for a solar panel aligns each of the one or more solar panels during the attachment of the one or more solar panels to the panel rack. The adjustable bracket for a solar panel comprises plurality of rafters and a panel support. The panel support attaches to the plurality of rafters. The plurality of rafters attaches to the panel rack. The panel support prevents movement by the one or more solar panels in the direction of the pitch. The plurality of rafters prevent lateral movement of the one or more solar panels relative to the pitch.

16 Claims, 5 Drawing Sheets

(56) References Cited

U.S. PATENT DOCUMENTS

| | | | |
|---|---|---|---|
| 2010/0276558 A1* | 11/2010 | Faust | F24S 25/12 |
| | | | 248/222.14 |
| 2011/0108089 A1 | 5/2011 | du Boise | |
| 2011/0214365 A1 | 9/2011 | Aftanas | |
| 2011/0283923 A1* | 11/2011 | Potter | B65D 85/48 |
| | | | 108/55.1 |
| 2012/0187267 A1 | 7/2012 | Hudson | |
| 2012/0217689 A1* | 8/2012 | Sambuceto | B25B 5/003 |
| | | | 269/37 |
| 2014/0175244 A1* | 6/2014 | West | F24S 25/33 |
| | | | 248/316.7 |
| 2015/0052712 A1 | 2/2015 | Markiewicz | |

\* cited by examiner

ADJUSTABLE BRACKET FOR A SOLAR PANEL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and the generation of electricity using photovoltaic panels, more specifically, an accessory for a supporting structure for a photovoltaic panel.

SUMMARY OF INVENTION

The adjustable bracket for a solar panel is a tool. The adjustable bracket for a solar panel is configured for use with one or more solar panels. Each of the one or more solar panels is mounted on a panel rack. The adjustable bracket for a solar panel aligns each of the one or more solar panels during the attachment of the one or more solar panels to the panel rack. The adjustable bracket for a solar panel aligns the one or more solar panels such that each of the one or more solar panels remains aligned after the adjustable bracket for a solar panel has been removed. The adjustable bracket for a solar panel attaches to the panel rack such that the adjustable bracket for a solar panel that supports the one or more solar panels in the direction of the pitch until the one or more solar panels are attached to the panel rack. The adjustable bracket for a solar panel comprises a plurality of rafters and a panel support. The panel support attaches the plurality of rafters to each other. Each of the plurality of rafters attaches to the panel rack. The panel support prevents movement by the one or more solar panels in the direction of the pitch. The plurality of rafters prevent lateral movement of the one or more solar panels relative to the pitch.

These together with additional objects, features and advantages of the adjustable bracket for a solar panel will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable bracket for a solar panel in detail, it is to be understood that the adjustable bracket for a solar panel is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable bracket for a solar panel.

It is therefore important that the claims be regarded as including such equivalent construction insofar as they do not depart from the spirit and scope of the adjustable bracket for a solar panel. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
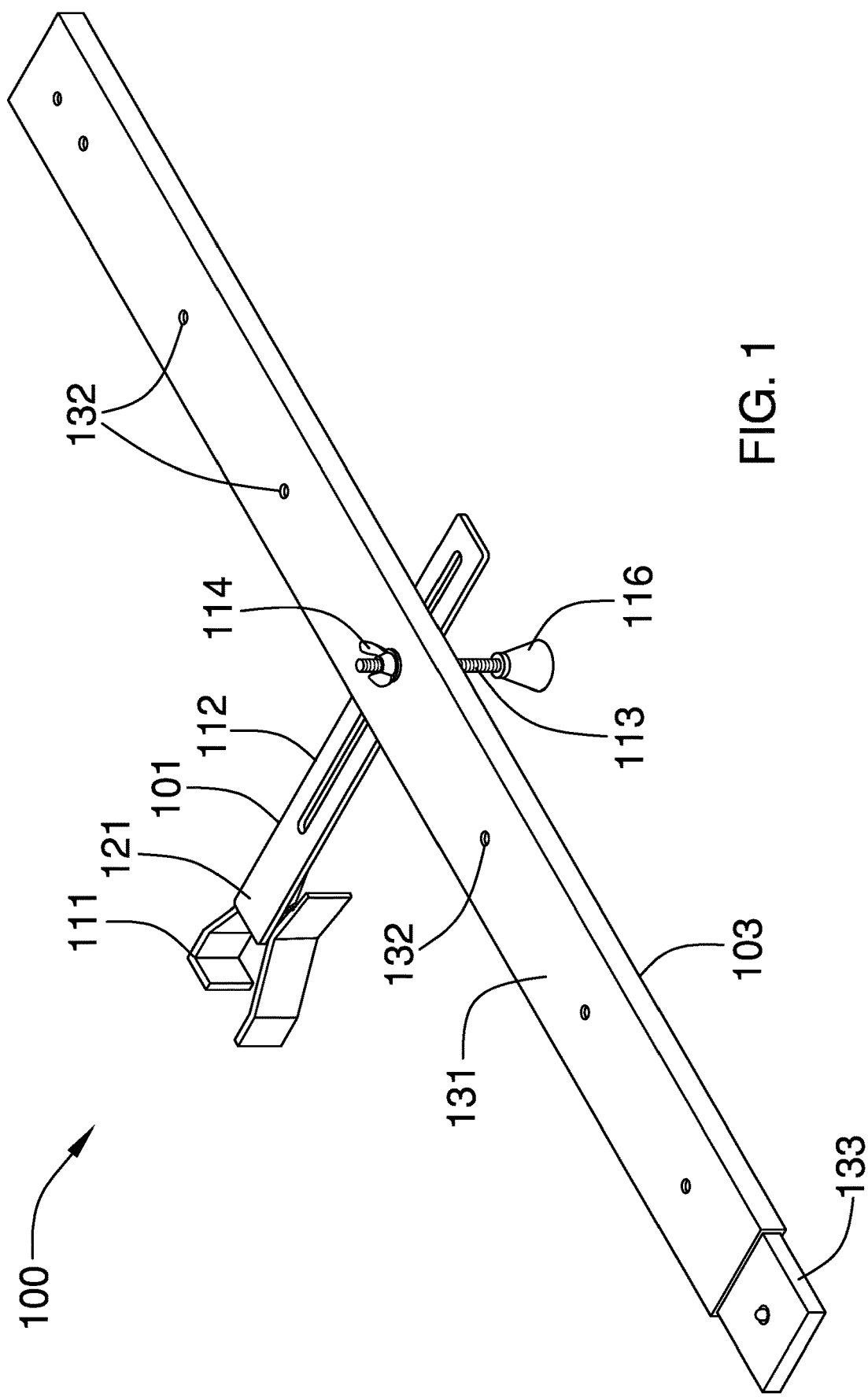
FIG. 1 is a perspective view of an embodiment of the disclosure.
Figure 2:
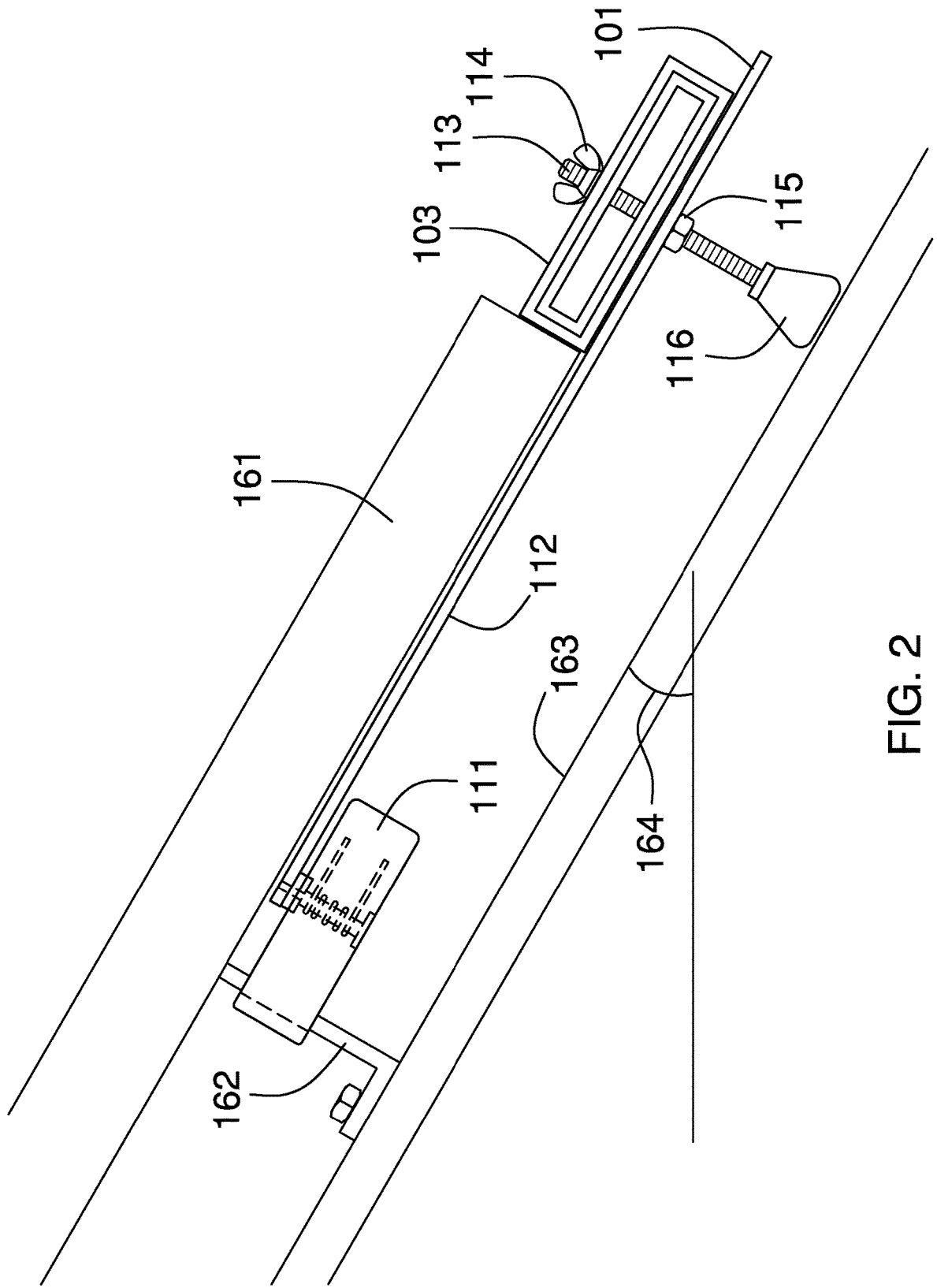
FIG. 2 is a side view of an embodiment of the disclosure.
Figure 3:
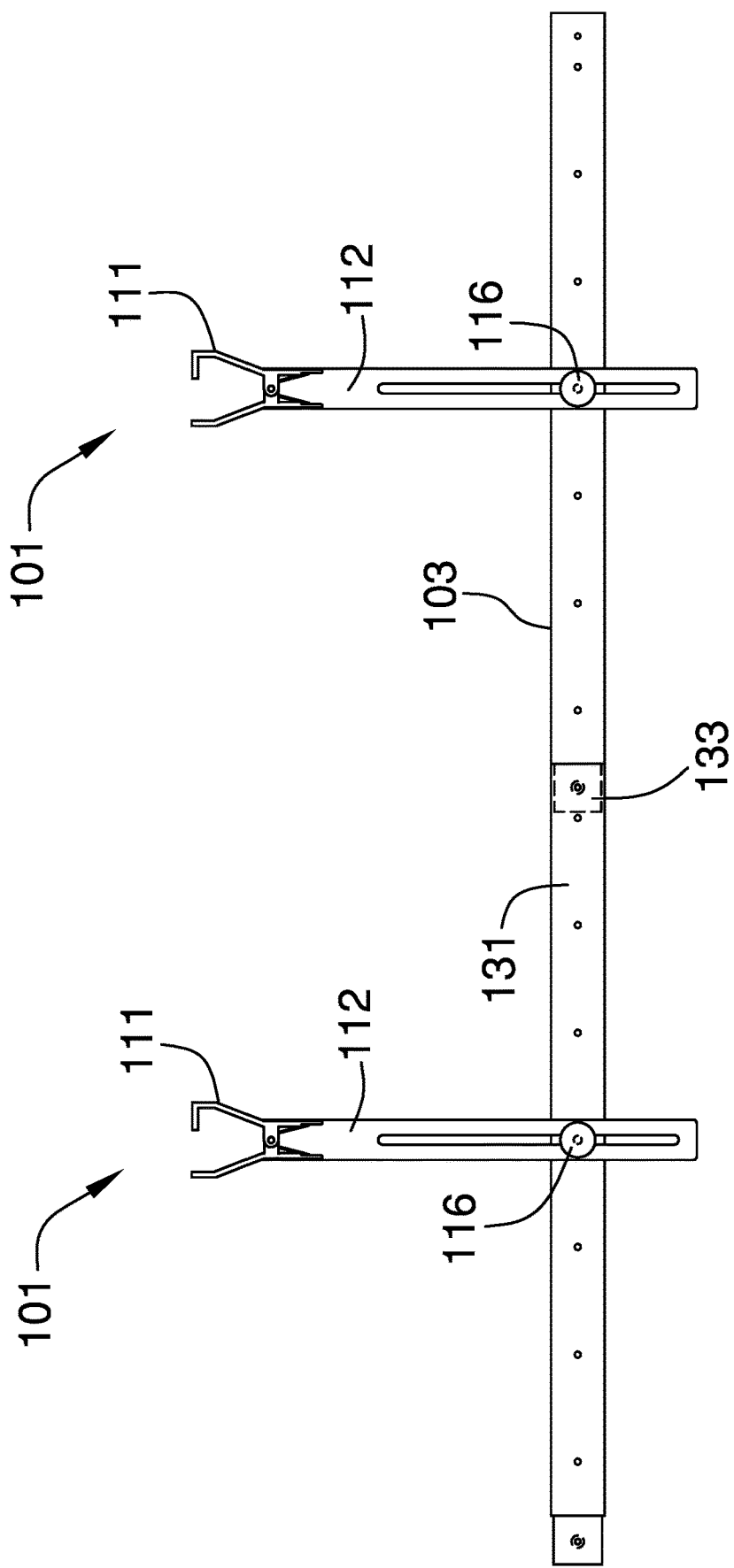
FIG. 3 is a bottom view of an embodiment of the disclosure.
Figure 4:
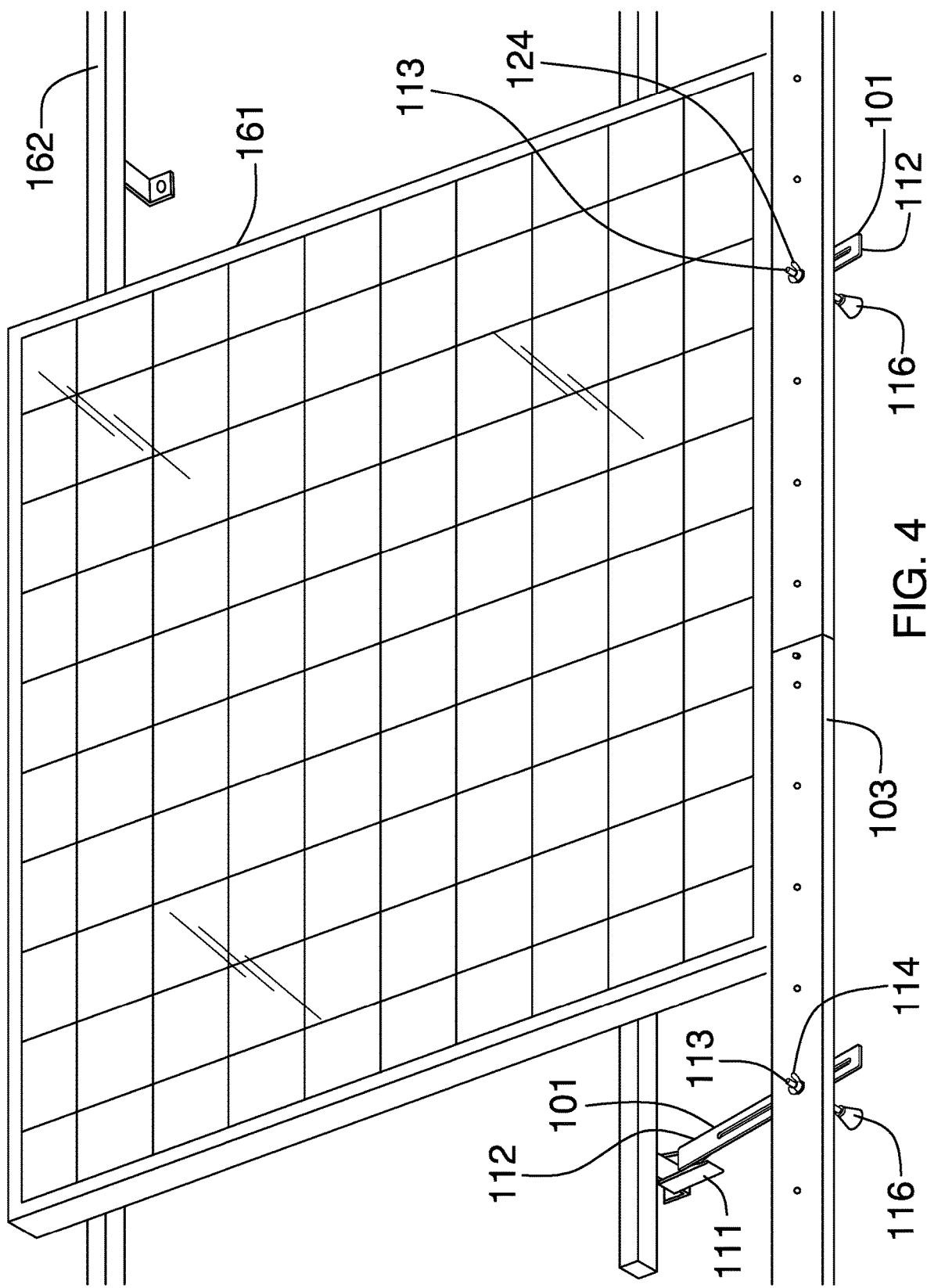
FIG. 4 is an in use view of an embodiment of the disclosure.
Figure 5:
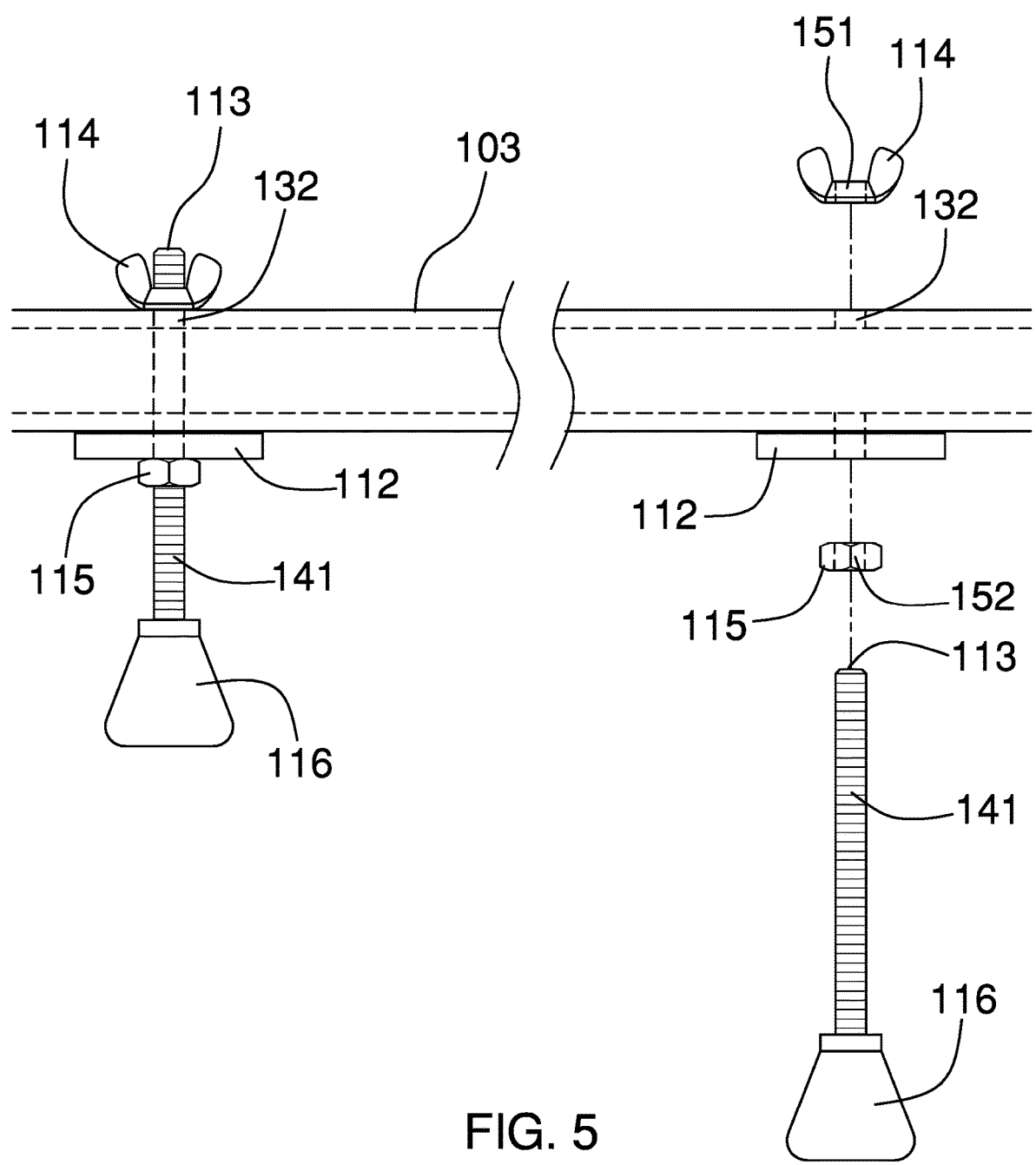
FIG. 5 is an in use view of an embodiment of the disclosure.

Detailed reference will now be made to one or more potential embodiments of the disclosure, which are illustrated in FIGS. 1 through 5.

The adjustable bracket for a solar panel 100 (hereinafter invention) is a tool. The invention 100 is configured for use with one or more solar panels 161. Each of the one or more solar panels 161 is mounted on a panel rack 162. The one or more solar panels 161 and the panel rack 162 are configured for use on a pitched roof 163. The invention 100 aligns each of the one or more solar panels 161 during the attachment of the one or more solar panels 161 to the panel rack 162. The invention 100 aligns the one or more solar panels 161 such that each of the one or more solar panels 161 remains aligned after the invention 100 has been removed. The invention 100 attaches to the panel rack 162 such that the invention 100 that supports the one or more solar panels 161 in the direction of the pitch 164 until the one or more solar panels 161 are attached to the panel rack 162. The pitch 164 refers to the arc of the cant formed by the pitched roof 163. The invention 100 comprises a plurality of rafters 101 and a panel support 103. The panel support 103 attaches the plurality of rafters 101 to each other. The plurality of rafters attaches to the panel rack 162. The panel support 103 prevents movement by the one or more solar panels 161 in the direction of the pitch 164. The plurality of rafters 101 prevent lateral movement of the one or more solar panels 161 relative to the pitch 164.

Each of the one or more solar panels 161 is a photovoltaic cell that is intended to be mounted on a pitched roof 163 for the purpose of generating electricity. The panel rack 162 is a rack upon which the one or more solar panels 161 are mounted. The pitched roof 163 is the roof of the building upon which the one or more solar panels 161 and the panel rack 162 are mounted. The pitched roof 163 is discussed in greater detail elsewhere in this disclosure. The pitch 164 is the measure of the slope of the roof. The pitch 164 is discussed in greater detail elsewhere in this disclosure.

The panel support 103 is a cross brace. The panel support 103 attaches perpendicularly to each of the plurality of rafters 101. The panel support 103 supports each of the one or more solar panels 161 such that the one or more solar panels 161 cannot slide off of the panel rack 162 in the pitch 164 direction. The panel support 103 comprises a metal perforated tube 131 and a plurality of perforations 132. The metal perforated tube 131 is a readily and commercially available perforated metal perforated tube commonly marketed as a metal perforated tube. Each of the plurality of perforations 132 is an aperture that is formed through the metal perforated tube 131. The metal perforated tube 131 further comprises a ferrule 133. The ferrule 133 is used to interconnect a plurality of metal perforated tube 131 into a single structure. The plurality of metal perforated tubes 131 are interconnected using a tent pole configuration. The ferrule 133 and the tent pole configuration are described in greater detail elsewhere in this disclosure. The use of a tent pole configuration to attach tubular objects is well-known and documented in the mechanical arts.

The plurality of rafters 101 is a support structure that runs parallel to the pitch 164. The purpose of the plurality of rafters is: 1) to support the one or more solar panels 161 as the extend beyond the panel rack 162 during the installation of the one or more solar panels 161; 2) to prevent the lateral movement of the one or more solar panels 161 during installation; 3) to fix the panel support 103 in position during use of the invention 100. Each of the plurality of rafters 101 is identical. Each of the plurality of rafters 101 comprises a fastener 111, a slotted bar 112, a bolt 113, a wing nut 114, a nut 115, and a footing 116. The slotted bar 112 is further defined with a first end 171.

The fastener 111 is a readily and commercially available spring loaded clip that attaches to the first end 171 of the slotted bar 112. The fastener 111 clips the slotted bar 112 to the panel rack 162.

The slotted bar 112 is a readily and commercially available item commonly referred to as a slotted flat bar. The slotted bar 112 is formed from a metal selected from the group consisting of aluminum or steel. The slotted bar 112 is formed with a plurality of apertures.

The bolt 113 is a readily and commercially available hardware item that is further defined with an outer diameter and a exterior screw thread 141. The bolt 113 is a part of a well-known and documented fastening device that attaches the panel support 103 to a rafter selected from the plurality of rafters 101. The outer diameter and threading of the exterior screw thread 141 of the bolt 113 is sized such that: 1) the bolt 113 can be screwed into the wing nut 114; and, 2) the bolt 113 can be screwed into the nut 115.

The wing nut 114 is a part of a well-known and documented fastening device that attaches the panel support 103 to a rafter selected from the plurality of rafters 101. The wing nut 114 is formed with an interior screw thread 151. The inner diameter and the interior screw thread 151 of the wing nut 114 are sized such that the bolt 113 can be screwed into the wing nut 114 to form a threaded connection. The wing nut 114 is intended to be hand tightened and loosened.

The nut 115 is a commercially available hardware item that is further defined with an inner diameter and a second interior screw thread 152. The nut 115 is a part of a well-known and documented fastening device that attaches the panel support 103 to a rafter selected from the plurality of rafters 101. The inner diameter and the second interior screw thread 152 of the nut 115 is sized such that the bolt 113 can be screwed into the nut 115 to form a threaded connection.

The footing 116 is a readily and commercially available end cap that is placed on an end of the bolt 113 such that the bolt 113 will not damage the pitched roof 163.

The fastener 111 fastens to the panel support 103 by: 1) screwing the bolt 113 through the nut 115; 2) inserting the bolt 113 through an aperture selected from the plurality of apertures associated with the slotted bar 112; 3) inserting the bolt 113 through a perforation selected from the plurality of perforations 132 of the metal perforated tube 131; and, 4) screwing the bolt 113 through the wing nut 114 such that the slotted bar 112 and the metal perforated tube 131 are sandwiched between the wing nut 114 and the nut 115.

Exterior screw threads 141 are discussed in greater detail elsewhere in this disclosure. Interior screw threads such as the first interior screw thread 151 and the second interior screw thread 152 are discussed in greater detail elsewhere in this disclosure. Threaded connections are discussed in greater detail elsewhere in this disclosure.

The initial assembly of the invention 100 requires a panel support 103 and a first rafter and a second rafter selected from the plurality of rafters 101. The panel support 103 is attached to and supported by both the first rafter and the second rafter as described elsewhere in this disclosure. When a second panel support 103 is attached to the initially installed panel support 103, the ferrule 133 of the second panel support 103 is inserted into the initially installed panel support 103 as described elsewhere in this disclosure. At least one additional rafter selected from the plurality of rafters 101 will be required to support the second panel support. The additional rafter is attached to and supported by the additional rafter as described elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bolt: As used in this disclosure, a bolt is a cylindrical shaft that is formed with an exterior screw thread. A bolt is defined with an outer diameter.

Cant: As used in this disclosure, a cant is an angular deviation from one or more reference planes such as a vertical plane or a horizontal plane.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder. The center axis of a pyramid refers to a line formed through the apex of the pyramid that is perpendicular to the base of the pyramid. When the center axes of two cylinder or cylinder like structures share the same line they are said to be aligned. When the center axes of two cylinder like structures do not share the same line they are said to be offset.

Clip: As used in this disclosure, a clip is a fastener that attaches to an object by gripping or clasping the object. A clip is typically spring loaded.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Diameter: As used in this disclosure, a diameter of an object is a straight line segment, or a radial line, that passes through the center or a center axis of an object. The line segment of the diameter is terminated at the perimeter or boundary of the object through which the line segment of the diameter runs.

Exterior Screw Thread: An exterior screw thread is a ridge wrapped around the outer surface of a tube in the form of a helical structure that is used to convert rotational movement into linear movement.

Fastener: As used in this disclosure, a fastener is a device that is used to join or affix two objects. Fasteners generally comprise a first element that is attached to the first object, and a second element that is attached to the second object such that the first element and the second element join to affix the first object and the second object.

Ferrule: As used in this disclosure, a ferrule is a device that is used to interconnect pipes in a tent pole configuration.

Helix: As used in this disclosure, a helix is the three dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Inner Diameter: As used in this disclosure, the term inner diameter is used in the same way that a plumber would refer to the inner diameter of a pipe.

Interior Screw Thread: An interior screw thread is a groove that is formed around the inner surface of a tube in the form of a helical structure that is used to convert rotational movement into linear movement.

Lateral: As used in this disclosure, the term lateral refers to the movement of an object that is perpendicular to the previously determined or expected direction of movement of the object.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

Pitch: As used in this disclosure, a pitch refers to a cant formed between a line or a plane and the horizon.

Pitched Roof: As used in this disclosure; a pitched roof refers to a roof wherein the surface of the roof forms pitch relative to the horizon.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal. When made of wood, a plate is often referred to as a board.

Photovoltaic Panel: As used in this disclosure, a photovoltaic panel is an electrical device that directly converts light energy into electrical energy.

Outer Diameter: As used in this disclosure, the term outer diameter is used in the same way that a plumber would refer to the outer diameter of a pipe.

Screw: When used as a verb in this disclosure, to screw means: 1) to fasten or unfasten (unscrew) a threaded connection; or 2) to attach a helical structure to a solid structure.

Slide: As used in this disclosure, slide is a verb that refers to an object that is transported along a surface while in continuous contact with the surface. An object being transported along a surface with wheels cannot be said to be sliding.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Rack: As used in this disclosure, a rack is a structure that holds or supports and object in a visible or exposed manner.

Tent Pole Configuration: As used in this disclosure, a tent pole configuration is a method of interconnecting a plurality of pipes (or other hollow tubular objects). With the exception of the span of the length of the center axis of the pipe, each pipe contained in the plurality of pipes is otherwise identical to the pipes remaining in the plurality of pipes. In a tent pole configuration, each of the plurality of pipes is fitted with a ferrule. The ferrule is an object that is attached to an end of each pipe such that the center axis of the ferrule is aligned with the center axis of the pipe. The outer diameter of the ferrule is less than the inner diameter of the pipe. To interconnect the plurality of pipes into a tent pole configuration, the ferrule of a first pipe selected from the plurality of pipes is inserted into the non-ferrule end of a second pipe selected from the plurality of pipes. This process is continued until all the pipes contained within the plurality of pipes are interconnected.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Tool: As used in this disclosure, a tool is a device, an apparatus, or an instrument that is used to carry out an activity, operation, or procedure.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An alignment tool comprising
a plurality of rafters each including an extending member with grippers, a panel support with each said rafter including an elongated member with a telescoping member and a panel rack including an elongated member with an attachment element;
wherein the panel support attaches the plurality of rafters to each other;
wherein the plurality of rafters attaches to the panel rack;
wherein the alignment tool is for use with one or more solar panels in order to align said one or more solar panels during installation on a pitched roof;
wherein each of the one or more solar panels is mounted on the panel rack;
wherein the one or more solar panels and the panel rack are for use on the pitched roof;
wherein the alignment tool aligns each of the one or more solar panels during the attachment of the one or more solar panels to the panel rack;
wherein the alignment tool aligns the one or more solar panels such that each of the one or more solar panels remains aligned after the alignment tool has been removed;
wherein the alignment tool attaches to the panel rack such that the alignment tool that supports the one or more solar panels in the direction of the pitch until the one or more solar panels are attached to the panel rack;
wherein the panel support prevents movement by the one or more solar panels in the direction of the pitch;
wherein the plurality of rafters prevent lateral movement of the one or more solar panels relative to the pitch.

2. The alignment tool according to claim 1
wherein said elongated member of the panel support said elongated member is a cross brace;
wherein the panel support said elongated member attaches perpendicularly to the plurality of rafters and wherein the panel support telescoping member is a tube with a ferrule.

3. The alignment tool according to claim 2
wherein the panel support said elongated member comprises a metal perforated tube and a plurality of perforations;
wherein each of the plurality of perforations is an aperture that is formed through the metal perforated tube.

4. The alignment tool according to claim 3 wherein the plurality of rafters said each extending members forms a support structure that runs parallel to the pitch.

5. The alignment tool according to claim 4
wherein each of the plurality of rafters comprises a fastener, a slotted bar being said each extending member, a bolt, a wing nut, a nut, and a footing;
wherein the fastener attaches to the slotted bar;
wherein the footing attaches to the bolt;
wherein the bolt, the wing nut and the nut attach the slotted bar to the panel support
wherein the slotted bar is further defined with a first end;
wherein the bolt is further defined with an outer diameter and an exterior screw thread.

6. The alignment tool according to claim 5
wherein the fastener is a spring loaded clip;
wherein the fastener attaches to the end of the first slotted bar;
wherein the fastener clips the slotted bar to the panel rack.

7. The alignment tool according to claim 6
wherein the slotted bar is a slotted flat bar;
wherein the slotted bar is formed from a metal selected from the group consisting of aluminum or steel;
wherein the slotted bar is formed with a plurality of apertures.

8. The alignment tool according to claim 7
wherein the outer diameter is sized such the bolt screws into the wing nut;
wherein the outer diameter is sized such the bolt screws into the nut;
wherein the exterior screw thread is sized such the bolt screws into the wing nut;
wherein the exterior screw thread is sized such the bolt screws into the nut.

9. The alignment tool according to claim 8
wherein the wing nut is formed with a first inner diameter and a first interior screw thread;
wherein the first inner diameter and the first interior screw thread of the first wing nut are sized such that the first bolt can be screwed into the first wing nut to form a first threaded connection.

10. The alignment tool according to claim 9
wherein the first nut is a further defined with a second inner diameter and a second interior screw thread;
wherein the second inner diameter and the second interior screw thread of the first nut are sized such that the first bolt can be screwed into the first nut to form a second threaded connection.

11. The alignment tool according to claim 10 wherein the first fastener fastens to the panel support such that the first slotted bar and the metal perforated tube are sandwiched between the first wing nut and the first nut.

12. The alignment tool according to claim 11 wherein the first footing is an end cap.

13. The alignment tool according to claim 12
wherein the metal perforated tube further comprises a ferrule;
wherein the ferrule interconnects a plurality of panel supports in a tent pole configuration.

14. The alignment tool according to claim 13 wherein the ferrule attaches a first panel support to a second panel support by inserting the ferrule of the second panel directly into the first panel support.

15. The alignment tool according to claim 14 wherein the initial assembly of the alignment tool comprises a first panel support and a first rafter and a second rafter selected from the plurality of rafters.

16. The alignment tool according to claim 15 wherein the addition of a second panel support to the initial assembly further comprises a third rafter selected from the plurality of rafters.

* * * * *